United States Patent
Mitamura (10) Patent No.: US 11,442,298 B2
(45) Date of Patent: Sep. 13, 2022

(54) OPTICAL MODULATION DEVICE AND METHOD FOR MANUFACTURING OPTICAL MODULATION DEVICE

(71) Applicant: Fujitsu Optical Components Limited, Kawasaki (JP)

(72) Inventor: Nobuaki Mitamura, Saitama (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 16/944,591

(22) Filed: Jul. 31, 2020

(65) Prior Publication Data
US 2021/0072569 A1   Mar. 11, 2021

(30) Foreign Application Priority Data
Sep. 6, 2019   (JP) .............. JP2019-163416

(51) Int. Cl.
*G02F 1/065* (2006.01)
*G02F 1/03* (2006.01)

(52) U.S. Cl.
CPC ............ *G02F 1/065* (2013.01); *G02F 1/0316* (2013.01)

(58) Field of Classification Search
CPC ............................ G02F 1/065; G02F 1/0316
See application file for complete search history.

(56) References Cited

U.S. PATENT DOCUMENTS

| | | | | |
|---|---|---|---|---|
| 4,640,583 A * | 2/1987 | Hoshikawa | ............ | G02F 1/1341 349/122 |
| 5,589,668 A * | 12/1996 | Yamaguchi | ......... | H01L 23/4985 174/260 |
| 5,771,562 A * | 6/1998 | Harvey, III | ......... | H01L 51/5243 29/592.1 |
| 6,664,137 B2 * | 12/2003 | Weaver | ................. | H01L 25/047 257/E25.009 |
| 6,788,449 B2 * | 9/2004 | Liang | ..................... | B29C 39/18 359/296 |
| 6,842,657 B1 * | 1/2005 | Drzaic | ................. | G02F 1/1345 438/99 |
| 7,110,163 B2 * | 9/2006 | Webber | ................ | G02F 1/1675 359/296 |

(Continued)

FOREIGN PATENT DOCUMENTS

| | | |
|---|---|---|
| JP | 2005-017648 A | 1/2005 |
| JP | 2014-130196 A | 7/2014 |

(Continued)

OTHER PUBLICATIONS

Charles, Harry, Materials in Electronic Packaging AT APL, Johns Hopkins APL Technical Digest, vol. 14, No. J (1993) (Year: 1993).*
K. Ikemura, Y. Akada, S. Ito, M. Sano and T. Nishioka, "Multi layer film adhesive for IC packaging applications," 1995 Proceedings. 45th Electronic Components and Technology Conference, 1995, pp. 688-691, doi: 10.1109/ECTC.1995.517763. (Year: 1995).*

(Continued)

*Primary Examiner* — Peter Radkowski
(74) *Attorney, Agent, or Firm* — Staas & Halsey LLP (57) ABSTRACT

An optical modulation device includes a substrate, a slot waveguide formed by arranging a pair of electrodes in a groove formed on one side of the substrate and by filling the groove with an electro-optical material, a dielectric film that covers a surface of the electro-optic material filled in the slot waveguide, and a plate member that covers the slot waveguide and is bonded to the dielectric film with an adhesive resin.

7 Claims, 6 Drawing Sheets

(56) References Cited

U.S. PATENT DOCUMENTS

| | | | |
|---|---|---|---|
| 7,150,955 B2* | 12/2006 | Sato | G03F 7/095 |
| | | | 430/156 |
| 7,688,497 B2* | 3/2010 | Danner | G02F 1/1333 |
| | | | 359/296 |
| 10,162,111 B1* | 12/2018 | Lebby | G02B 6/4248 |
| 10,317,767 B2* | 6/2019 | Paolini, Jr. | H05K 3/027 |
| 2002/0140347 A1* | 10/2002 | Weaver | H01L 51/0097 |
| | | | 313/506 |
| 2007/0035808 A1* | 2/2007 | Amundson | G02F 1/167 |
| | | | 359/296 |
| 2008/0254272 A1* | 10/2008 | Danner | G02F 1/1333 |
| | | | 428/220 |
| 2009/0022445 A1 | 1/2009 | Hochberg et al. | |
| 2015/0098701 A1 | 4/2015 | Ohtsuka | |
| 2019/0085199 A1 | 3/2019 | Yokohama et al. | |

FOREIGN PATENT DOCUMENTS

| | | | |
|---|---|---|---|
| JP | 2015-075598 A | | 4/2015 |
| KR | 20060087489 A | * | 8/2006 |
| WO | WO 2017/159815 A | | 9/2017 |

OTHER PUBLICATIONS

Kieninger et al., Ultra-high electro-optic activity demonstrated in a silicon-organic hybrid modulator, Optica, vol. 5, No. 6 / Jun. 2018 /739 (Year: 2018).*

Leterrier, Yves, Durability of nanosized oxygen-barrier coatings on polymers, Progress in Materials Science 48 (2003) 1-55 (Year: 2003).*

S. Wolf, H. Zwickel, C. Kieninger, M. Lauermann, W. Hartmann, Y. Kutuvantavida, W. Freude, S. Randel, and C. Koos, "Coherent modulation up to 100 GBd 16QAM using silicon-organic hybrid (SOH) devices," Opt. Express 26, 220-232 (2018) (Year: 2018).*

Daniele Rezzonico et al.; "Photostability studies of π-conjugated chromophores with resonant and nonresonant light excitation for long-life polymeric telecommunication devices"; vol. 24, No. 9/Sep. 2007J. Opt. Soc. Am. B 2199; Nonlinear Optics Laboratory, Swiss Federal Institute of Technology, ETH Zurich, CH-8093, Zurich, Switzerland, Swiss Center for Electronics and Microtechnology, CSEM, CH-6055, Alpnach, Switzerland, Department of Chemistry, University of Washington, P.O. Box 351700, Seattle, Washington 98195, USA; published Aug. 14, 2007; (9 pages).

* cited by examiner

OPTICAL MODULATION DEVICE AND METHOD FOR MANUFACTURING OPTICAL MODULATION DEVICE

CROSS-REFERENCE TO RELATED APPLICATION

This application is based upon and claims the benefit of priority of the prior Japanese Patent Application No. 2019-163416, filed on Sep. 6, 2019, the entire contents of which are incorporated herein by reference.

FIELD

The embodiments discussed herein are related to an optical modulation device and a method for manufacturing an optical modulation device.

BACKGROUND

In recent years, with a rapid increase in transmission capacity of an optical communication network for transmitting, for example, internet protocol (IP) data, communication devices that deal with the increased transmission capacity is being actively developed. An optical modulator, for example, is an important factor to achieve high-speed data transmission. There is demand for speed as high as about 400 gigabit (Gbit)/sec (64 Gbaud/sec at a symbol rate).

Recently, an optical modulator including an electro-optic organic material (polymer material) which has a higher electro-optic effect and a wider bandwidth than lithium niobate ($LiNbO_3$) is expected as an optical modulator that enables ultra-high-speed optical communication. In particular, there is proposed an EO polymer modulator including a slot waveguide where an electro-optic polymer material (hereinafter referred to as "EO polymer") is applied and filled between two adjacent conductive electrodes. Since EO polymer modulators have an advantage of reducing a drive voltage, they are highly anticipated as compact, low-power, ultra-high-speed optical modulators. EO polymers have significantly improved in heat resistance which is one of reliability problems, and practical use of EO polymers is being studied.

[Patent Document 1] Japanese Laid-open Patent Publication No. 2005-17648
[Patent Document 2] Japanese Laid-open Patent Publication No. 2015-75598
[Patent Document 3] U.S. Patent Application Publication No. 2009/0022445
[Patent Document 4] International Publication Pamphlet No. 2017/159815
[Patent Document 5] Japanese Laid-open Patent Publication No. 2014-130196
[Non-Patent Document 1] D. Rezzonico et al., "Photostabililty studies of pi-conjugated chromophores with resonant and nonresonant light excitation for long-life polymeric telecommunication devices", J. Opt. Soc. Am. B., vol. 24, no. 9, pp. 2199-2207, 2007

However, when strong light having an optical wavelength band of, for example, 1550 nm (nanometer) passes through an EO polymer in the air (that is, when an EO polymer is in contact with oxygen), the EO polymer deteriorates (such a phenomenon is called as "photooxidation"), which may lead to the degradation of an EO polymer modulator in modulation characteristics and optical characteristics.

As a measure against this problem, it is considered to mount an EO polymer modulator on a hermetically sealed package so that the EO polymer does not come into contact with oxygen. However, in general, mounting an optical integrated device in a hermetically sealed package brings down a cost increase. In other words, an EO polymer modulator in a hermetically sealed package is connected to the outside of the hermetically sealed package by, for example, an optical fiber in which a portion penetrating the hermetically sealed package is metalized. The hermetically sealed package itself and components such as the metalized optical fiber generates additional costs. Furthermore, when an EO polymer modulator is sealed in a hermetically sealed package, an opening of the hermetically sealed package is sealed by, for example, seam welding under an atmosphere in which nitrogen is substituted. Accordingly, equipment for such additional steps is desired, which makes it difficult to reduce costs.

SUMMARY

According to an aspect of an embodiment, an optical modulation device includes a substrate, a slot waveguide formed by arranging a pair of electrodes in a groove formed on one side of the substrate and by filling the groove with an electro-optical material, a dielectric film that covers a surface of the electro-optic material filled in the slot waveguide, and a plate member that covers the slot waveguide and is bonded to the dielectric film with an adhesive resin.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to this embodiment.

Figure 1:
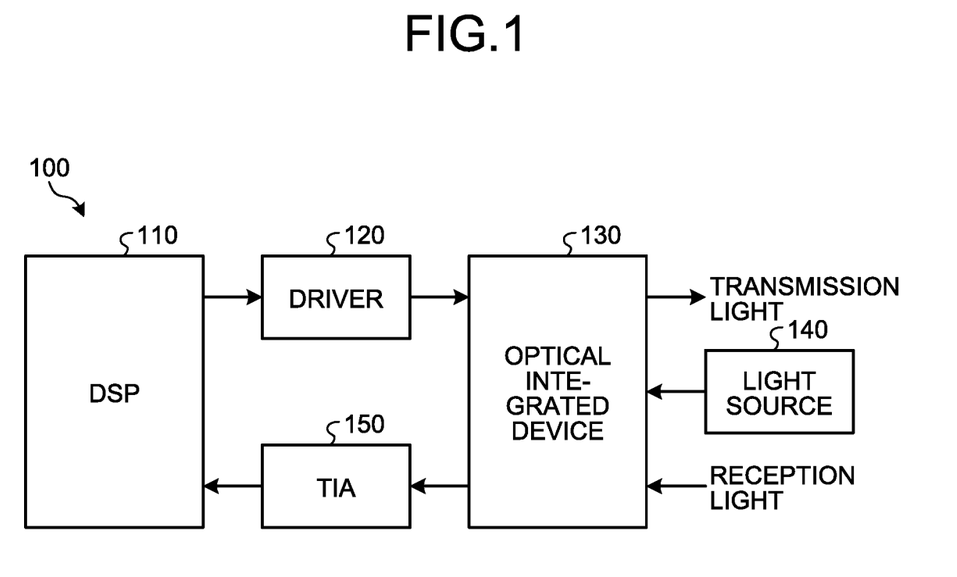
FIG. 1 is a block diagram illustrating a configuration of an optical communication device according to an embodiment.

FIG. 1 is a block diagram illustrating a configuration of an optical communication device 100 according to an embodiment. The optical communication device 100 illustrated in FIG. 1 includes a digital signal processor (DSP) 110, a driver 120, an optical integrated device 130, a light source 140, and a trans impedance amplifier (TIA) 150.

The DSP 110 executes, for example, coding and modulation of transmitted data to generate a modulated transmission signal which is an electric signal. The DSP 110 then outputs the modulated transmission signal to the driver 120. The DSP 110 also acquires a reception signal output from the TIA 150 and executes demodulation and decoding of the reception signal.

The driver 120 amplifies the modulated transmission signal and outputs the signal to the optical integrated device 130.

The optical integrated device 130 uses the modulated transmission signal to optically modulate source light entering from the light source 140 and generates transmission light on which transmitted data is superimposed. The optical integrated device 130 then emits the transmission light to, for example, an optical fiber (not illustrated). The optical integrated device 130 also acquires reception light entering from, for example, the optical fiber (not illustrated) and uses the source light entering from the light source 140 to convert the reception light into a reception signal which is an electric signal.

The light source 140 is, for example, a tunable laser light source and generates source light having a desired wavelength. The light source 140 causes the source light to enter the optical integrated device 130 via, for example, an optical waveguide formed on a substrate.

The TIA 150 amplifies the reception signal output from the optical integrated device 130 and outputs the signal to the DSP 110.

Figure 2:
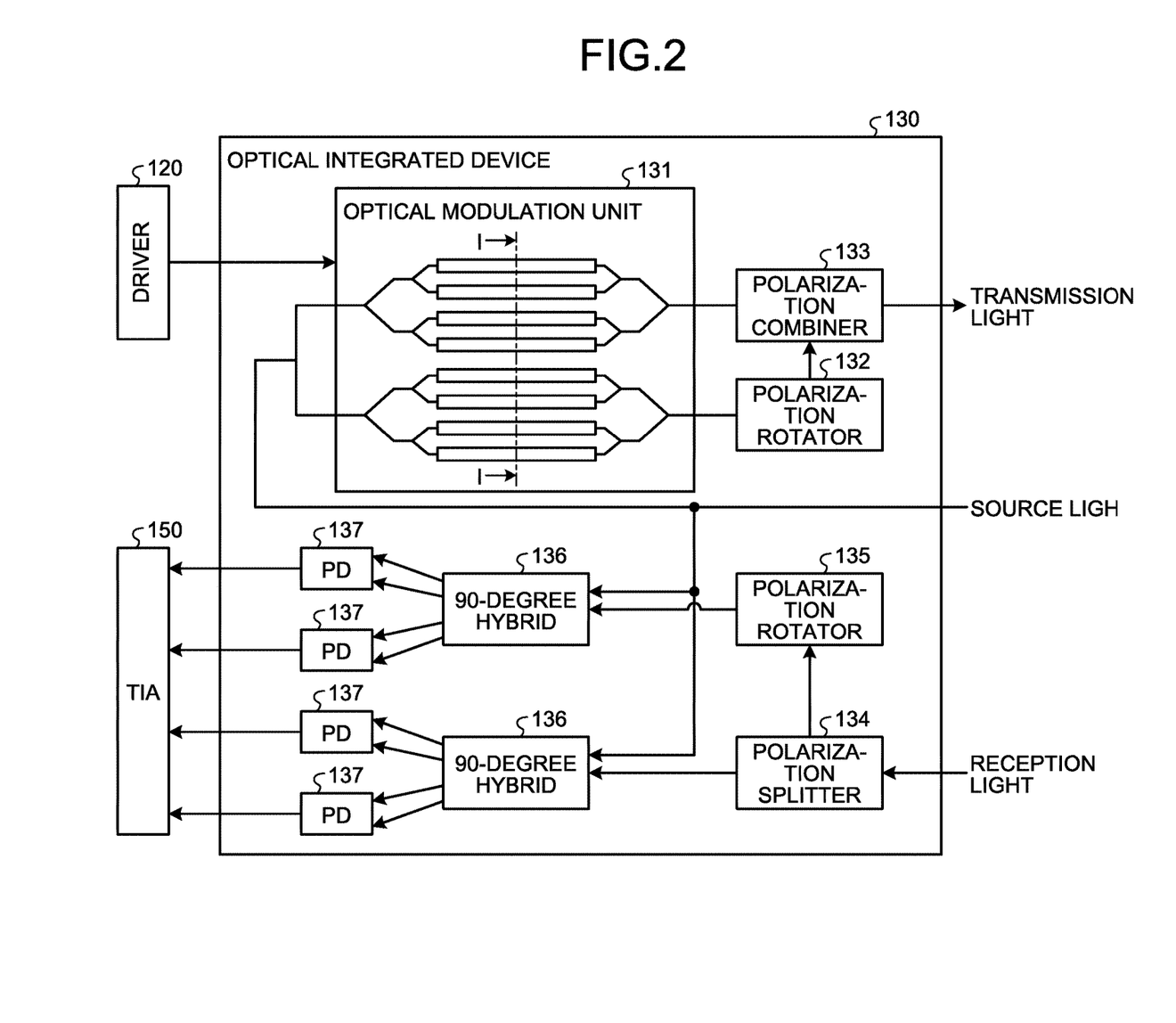
FIG. 2 is a view illustrating a configuration of an optical integrated device according to an embodiment.

FIG. 2 is a view illustrating a configuration of the optical integrated device 130. The optical integrated device 130 illustrated in FIG. 2 includes an optical modulation unit 131, a polarization rotator 132, a polarization combiner 133, a polarization splitter 134, a polarization rotator 135, a 90-degree hybrid 136, and a photo diode (hereinafter abbreviated as "PD") 137.

The optical modulation unit 131 includes two parent Mach-Zehnder interferometers and four child Mach-Zehnder interferometers that include eight slot waveguides. The optical modulation unit 131 is a dual-polarization quadrature phase shift keying (DP-QPSK) modulator of the source light. In other words, the optical modulation unit 131 changes voltages of electrodes (not illustrated) by the modulated transmission signal input from the driver 120 to change interference conditions of the Mach-Zehnder interferometers and superimposes the transmitted data on the source light to generate modulated signal light. At this time, the optical modulation unit 131 uses two parent Mach-Zehnder interferometers to generate two kinds of modulated signal light on which transmitted data are superimposed. A structure of the optical modulation unit 131 will be described in detail later.

The polarization rotator 132 rotates a polarization direction of modulated signal light generated by one of the two parent Mach-Zehnder interferometers by 90 degrees.

The polarization combiner 133 combines modulated signal light generated by the other parent Mach-Zehnder interferometer of the two parent Mach-Zehnder interferometers and the modulated signal light whose polarization direction is rotated by the polarization rotator 132 so as to generate transmission light. In other words, different transmitted data are superimposed on two polarized waves whose polarization directions are different from each other by 90 degrees such as a horizontally polarized wave and a vertically polarized wave of the transmission light.

The polarization splitter 134 splits two polarized waves of the reception light such as a horizontally polarized wave and a vertically polarized wave having polarization directions different from each other by 90 degrees. The polarization splitter 134 then outputs one polarized wave to the polarization rotator 135 and outputs the other polarized wave to the 90-degree hybrid 136. Different data are superimposed on the two polarized waves.

The polarization rotator 135 rotates a polarization direction of one polarized wave output from the polarization splitter 134 by 90 degrees. In other words, the polarization rotator 135 equalizes polarization directions of two polarized waves obtained from the reception light.

The 90-degree hybrid 136 makes the polarized waves of the reception light interfere with the source light and converts phase states of the polarized waves of the reception light into light intensities. In other words, the 90-degree hybrid 136 uses the source light as reference light and outputs total four types of output light: a set of output light in which the polarized waves of the reception light and the source light interfere with each other in the same phase and opposite phase, and a set of output light in which the polarized waves of the reception light and the source light interfere with each other in the orthogonal matrix and inverse matrix.

The PD 137 is, for example, a light receiving element manufactured by doping germanium (Ge). The PD 137 differentially receives a set of output light from the 90-degree hybrid 136 and detects light intensities of an in-phase component and an orthogonal component of the polarized waves of the reception light. The PD 137 then outputs an electric signal corresponding to each light intensity to the TIA 150. The electric signals corresponding to the in-phase component and the orthogonal component of the polarized waves of the reception light are amplified by the TIA 150 and then demodulated by the DSP 110 to obtain data superimposed on each polarized wave.

Figure 3:
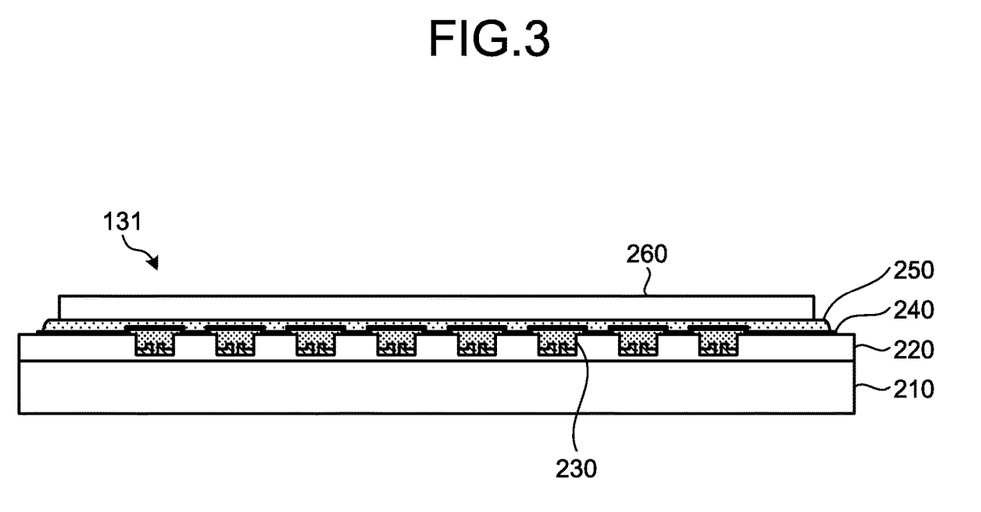
FIG. 3 is a schematic view illustrating a cross section of an optical modulation unit.

Next, the structure of the optical modulation unit 131 will be specifically described with reference to FIGS. 3 and 4. FIG. 3 is a schematic view illustrating a cross section of the optical modulation unit 131 taken along line I-I of FIG. 2. As illustrated in FIG. 3, in the optical modulation unit 131, a silica ($SiO_2$) layer 220 is formed on a silicon (Si) substrate 210, and the $SiO_2$ layer 220 includes eight parallel slot waveguides 230. In other words, the Si substrate 210 and the $SiO_2$ layer 220 are included in a substrate of the optical modulation unit 131, and the slot waveguides 230 are formed on this substrate. Furthermore, a dielectric film 240 is formed on surfaces of the $SiO_2$ layer 220 and the slot waveguides 230, and a plate 260 is bonded to the dielectric film 240 with an adhesive resin 250 having a low oxygen transmission rate.

Figure 4:
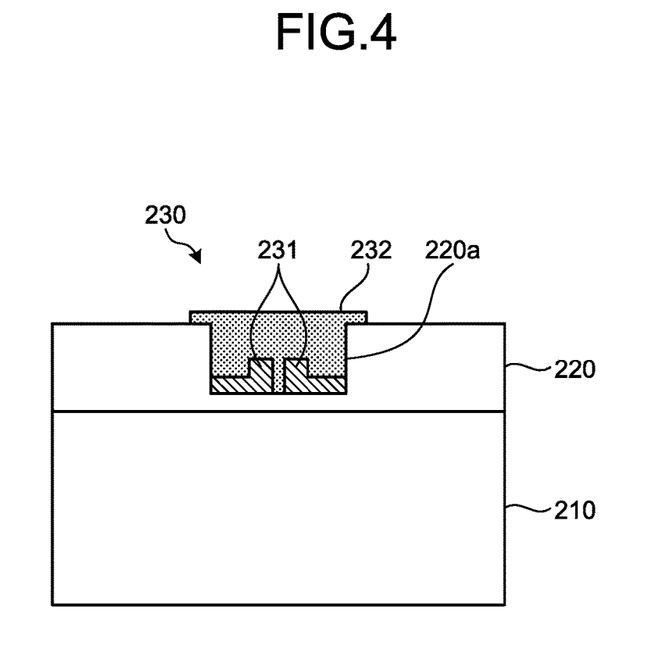
FIG. 4 is a view illustrating a configuration of a slot waveguide.

FIG. 4 is a view illustrating a configuration of the slot waveguide 230. As illustrated in FIG. 4, a groove 220a is formed in the $SiO_2$ layer 220, and a pair of electrodes 231 facing each other is disposed on the bottom surface of the groove 220a. The groove 220a has a width of, for example, about 20 to 40 µm, and the pair of electrodes 231 is about 0.15 µm away from each other. The groove 220a is filled with an EO polymer 232. Although the EO polymer 232 in FIG. 4 is also applied to the upper surface of the $SiO_2$ layer 220 around the groove 220a, the upper surface of the EO polymer 232 and the upper surface of the $SiO_2$ layer 220 may be coplanar. Examples of the EO polymer 232 include the non-linear optically active copolymers recited in International Publication Pamphlet No. 2017/159815 and Japanese Laid-open Patent Publication No. 2014-130196.

In such a slot waveguide 230, applying a voltage to the pair of electrodes 231 changes the EO polymer 232 in refractive index and optical path length. Accordingly, providing an appropriate voltage difference to arms of a child Mach-Zehnder interferometer having two slot waveguides 230 changes interference conditions of both arms and enables optical modulation of the source light.

Returning to FIG. 3, the dielectric film 240 covers the upper surface of the EO polymer 232 in each of the eight slot waveguides 230 and the upper surface of the SiO$_2$ layer 220. In other words, the dielectric film 240 is formed in a wider area than the area in which the eight slot waveguides 230 are disposed. Accordingly, the dielectric film 240 blocks oxygen gas contained in the air and prevents the EO polymer 232 in each of the slot waveguides 230 from deteriorating due to a contact with oxygen gas.

The dielectric film 240 has a thickness in a range of 1 to 200 nm (nanometer), and preferably in a range of 10 to 50 nm. With a film thickness less than 1 nm, there is a possibility that oxygen gas is not blocked sufficiently. With a film thickness over 200 nm, it takes time to form a film and cracks may occur, for example, due to heat.

Similarly to an aluminum (Al) oxide film and a silicon (Si) nitride film, the dielectric film 240 is formed by forming a dielectric such as an oxide, a nitride, or an oxynitride on the upper surface of the SiO$_2$ layer 220 and the EO polymer 232. The dielectric film 240 may also employ other oxides, nitride or oxynitride such as titanium (Ti), chrome (Cr), zinc (Zn), zirconium (Zr), niobium (Nb), tantalum (Ta), and tungsten (W). Since the dielectric film 240 functions to cover the upper surfaces of the SiO$_2$ layer 220 and the EO polymer 232, it is possible to prevent the parasitic capacitance and not to affect high-frequency characteristics of the optical modulation unit 131 as compared with a case where a film including a conductive metal film such as Al or gold (Au) is formed.

The resin 250 is adhesive and has a low oxygen transmission rate and is applied to a wider area than the area in which the eight slot waveguides 230 on the upper surface of the dielectric film 240 are disposed. Examples of the resin 250 include a two-component resin containing an epoxy resin base and a polyamine curing agent and an ethylene-vinyl alcohol copolymer resin. The layer of the resin 250 is preferably thin and has a thickness of, for example, about 1 to 5 μm. The resin 250 is applied to the upper surface of the dielectric film 240 and does not directly contact the EO polymer 232, which enables the prevention of chemical reactions between the resin 250 and the EO polymer 232.

The plate 260 has an area corresponding to an area to which the resin 250 is applied, and the plate 260 is impermeable to oxygen gas. The plate 260 is bonded with the resin 250 to cover the dielectric film 240. Examples of the plate 260 include a glass substrate or a Si substrate. Alternatively, the plate 260 may be a metal plate containing, for example, Al.

As described above, since the optical modulation unit 131 includes the EO polymer 232 covered with the dielectric film 240, the resin 250, and the plate 260, the EO polymer 232 does not come into contact with oxygen in the air. Accordingly, a photooxidation phenomenon does not occur even when strong light of, for example, about 12 dBm permeates the EO polymer 232, which makes it possible to prevent the degradation of the EO polymer 232 in modulation characteristics and optical characteristics. In addition, since no expensive component such as a hermetically sealed package is used, the deterioration of the EO polymer 232 can be prevented at low cost.

Next, a method for manufacturing the optical modulation unit 131 will be described with reference to FIGS. 5 to 7.

Figure 5:
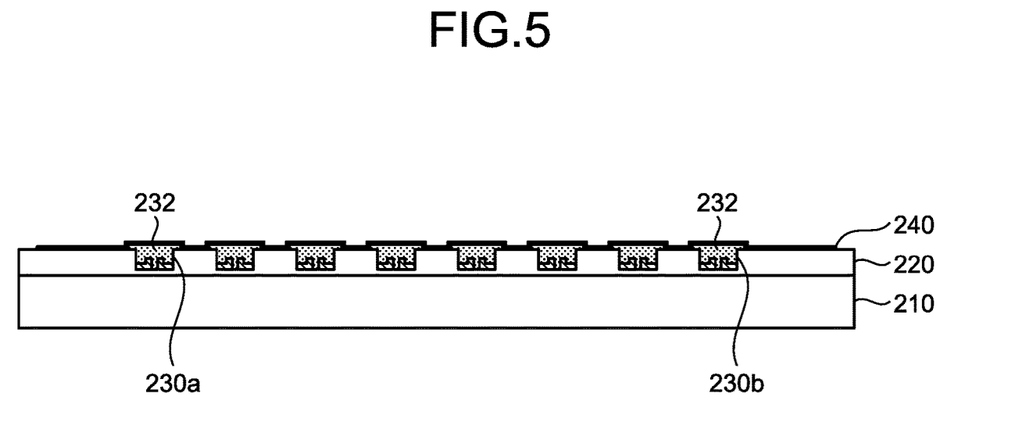
FIG. 5 is a view illustrating forming of a dielectric film.

The SiO$_2$ layer 220 is formed on the Si substrate 210, and the eight parallel slot waveguides 230 are formed in the SiO$_2$ layer 220, followed by forming the dielectric film 240 that covers the upper surfaces of the SiO$_2$ layer 220 and the slot waveguides 230 as illustrated in FIG. 5. The dielectric film 240 is formed, for example, by sputtering such as radio frequency (RF) sputtering at low temperatures and ion beam sputtering using a dielectric material such as Al oxide or Si nitride as a target material. The dielectric film 240 may be formed by other physical vapor deposition (PVD) such as vacuum vapor deposition, ion assisted vapor deposition, or ion plating instead of sputtering.

The dielectric film 240 continuously expands in an area that covers all the eight slot waveguides 230. The dielectric film 240 also covers regions close to the peripheral edges of the SiO$_2$ layer 220 from slot waveguides 230a and 230b at both ends. Regions in the upper surface of the SiO$_2$ layer 220 which are not covered with the dielectric film 240 are formed, for example, with a mask such as a shielding plate on a jig that holds the optical integrated device 130 during the film formation to prevent adhesion of a dielectric film to be formed.

Figure 6:
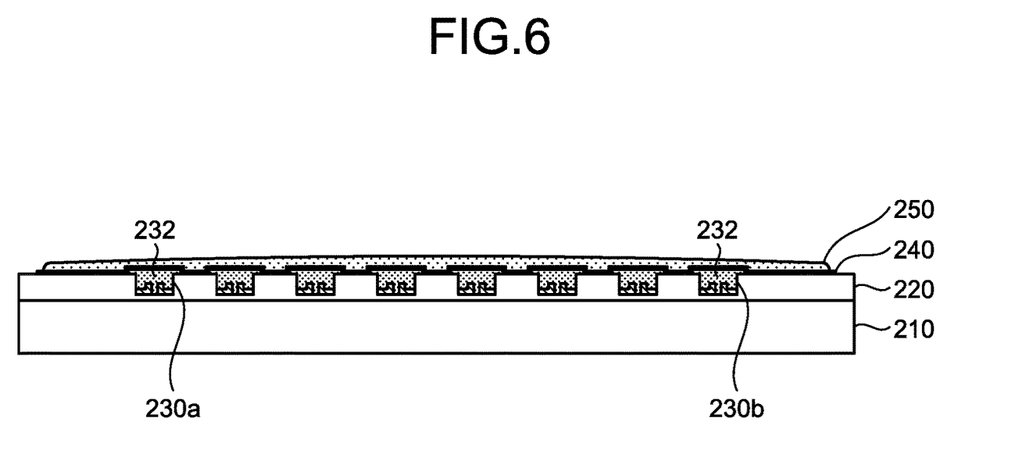
FIG. 6 is a view illustrating coating of a resin.

When the dielectric film 240 is formed, the resin 250 is applied to the upper surface of the dielectric film 240 as illustrated in FIG. 6. In other words, for example, a two-component resin including an epoxy resin base and a polyamine curing agent or the resin 250 having adhesiveness and a low oxygen transmission rate such as an ethylene-vinyl alcohol copolymer resin is applied to the upper surface of the dielectric film 240 having a thickness of, for example, about 1 to 5 μm. The resin 250 is applied to the area that covers all the eight slot waveguides 230.

Figure 7:
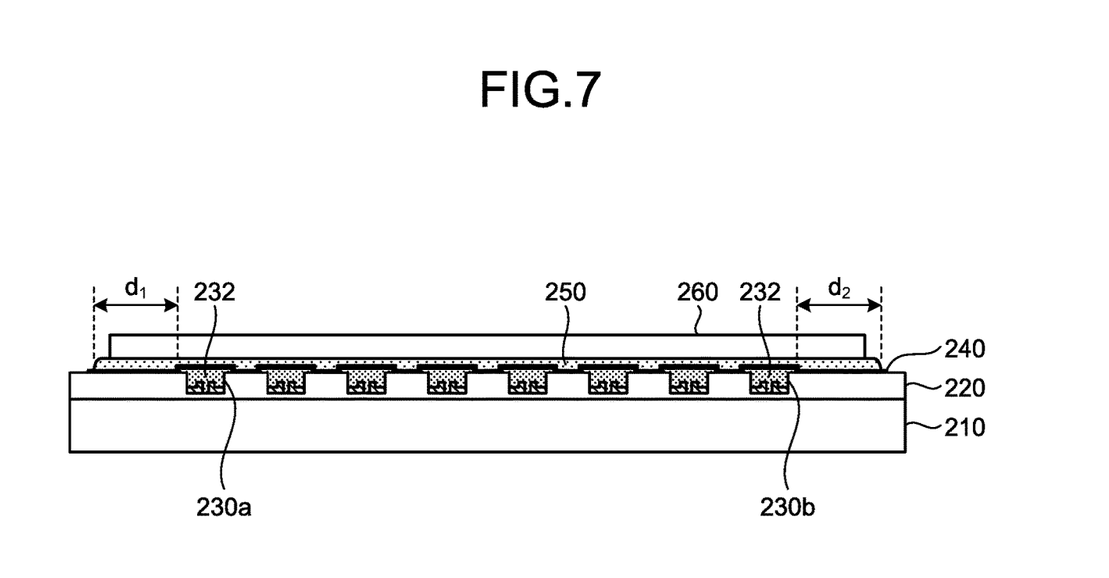
FIG. 7 is a view describing a distance between an EO polymer and oxygen.

As illustrated in FIG. 7, the plate 260 is placed on the resin 250, and the plate 260 is superposed on and bonded to the dielectric film 240. Since the resin 250 is applied to the area that covers all the eight slot waveguides 230, the plate 260 also has a dimension that covers all the eight slot waveguides 230, and all the slot waveguides 230 are covered with the dielectric film 240, the resin 250, and the plate 260.

Since the plate 260 is, for example, a glass substrate or a Si substrate which does not allow oxygen gas to pass therethrough, oxygen gas that has the highest possibility of reaching the EO polymer 232 of the slot waveguides 230 is in the air on the side close to the plate 260. However, the resin 250 and the dielectric film 240 both having lengths of $d_1$ and $d_2$ are interposed between the EO polymer 232 in each of the slot waveguides 230a and 230b at both ends and the oxygen gas in the air. Accordingly, the oxygen transmission rate up to the EO polymer 232 is significantly low, which makes it possible to prevent a photooxidation phenomenon of the EO polymer 232 with an inexpensive structure. In other words, it is possible to prevent the degradation of the EO polymer 232 in modulation characteristics and optical characteristics at low cost.

Figure 8:
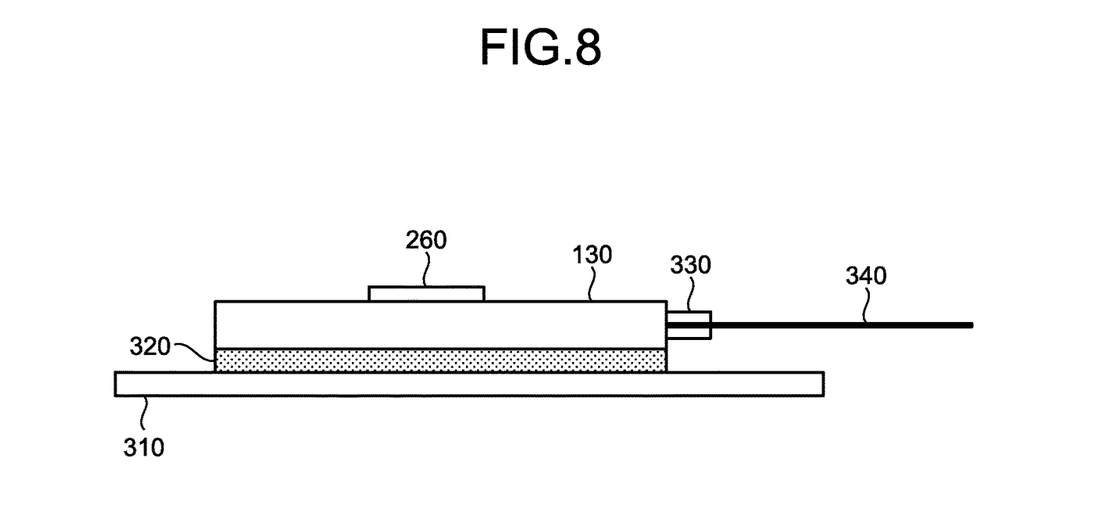
FIG. 8 is a view illustrating an example of how to mount an optical integrated device.

The optical integrated device 130 including the optical modulation unit 131 configured as described above is mounted on a circuit board together with other components. FIG. 8 is a side view illustrating a specific example of how to mount the optical integrated device 130. As illustrated in FIG. 8, the optical integrated device 130 in which a portion corresponding to the optical modulation unit 131 is covered with the plate 260 is bonded to a circuit board 310 with an adhesive 320. An optical fiber 340 is connected to an end face of an optical waveguide of the optical integrated device 130 via a glass block 330.

Although not illustrated in FIG. 8, a plurality of optical fibers 340 may be connected to the optical integrated device 130. The optical fiber 340 transmits the transmission light emitted from the optical integrated device 130 and makes the reception light or the source light enter into the optical integrated device 130. The end face of the optical waveguide of the optical integrated device 130 and the glass block 330 are bonded to each other, for example, by an optical adhesive (not illustrated).

In this manner, the optical integrated device 130 can be mounted on the circuit board 310 with an inexpensive structure without being stored in a component such as a hermetically sealed package.

As described above, according to this embodiment, a slot waveguide filled with an EO polymer in an optical modulation unit is covered with a dielectric film, and a plate is bonded to the dielectric film with an adhesive resin having a low oxygen transmission rate. Accordingly, it is possible to prevent a photooxidation phenomenon of the EO polymer without an expensive component such as a hermetically sealed package, and it is possible to inexpensively prevent the degradation of the EO polymer in modulation characteristics and optical characteristics.

Figure 9:
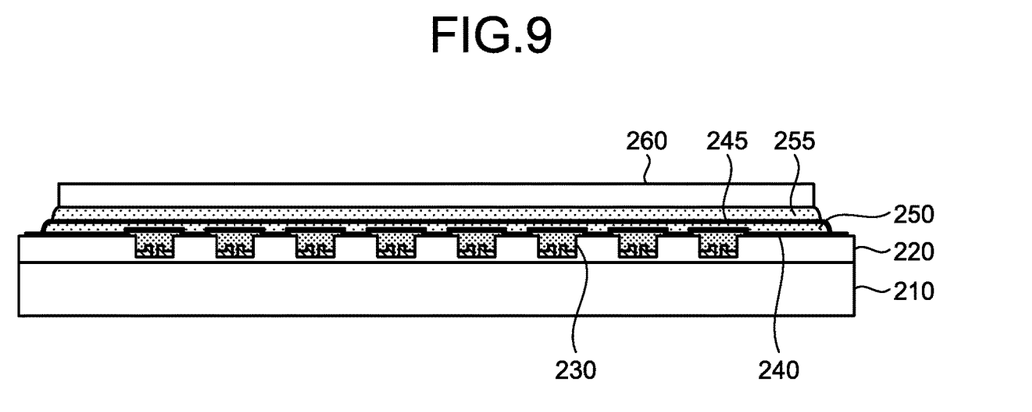
FIG. 9 is a schematic view illustrating a cross section of an optical modulation unit according to another embodiment.

In the embodiment, although the single-layer dielectric film 240 is formed to cover the EO polymer 232, multiple-layer dielectric films may also be formed. Specifically, for example, as illustrated in FIG. 9, after the resin 250 is applied to the upper surface of the dielectric film 240, a dielectric film 245 that covers the layer of the resin 250 may be formed. Then, a resin 255 may be applied to the upper surface of the dielectric film 245, and the plate 260 may be bonded with the resin 255. Forming the double-layer dielectric films 240 and 245 in this manner enables reduction of oxygen transmission rate up to the slot waveguides 230, which reliably prevents a photooxidation phenomenon of the EO polymer 232.

Furthermore, in the optical modulation unit 131 of the optical integrated device 130 in the embodiment, the slot waveguides 230 are covered with the dielectric film 240, the resin 250, and the plate 260. However, an independent optical modulator may have a similar structure.

Still further, in the embodiment, the slot waveguides 230 are covered with the dielectric film 240, the resin 250, and the plate 260 in order to prevent a photooxidation phenomenon of the EO polymer 232. However, in order to prevent the deterioration of electro-optical materials different from the EO polymer 232, for example, due to humidity, a structure similar to that of the optical modulation unit 131 according to the embodiment may be applied. In other words, for example, covering slot waveguides that contains a ferroelectric material such as $LiNO_3$ (lithium nitrate) and $BaTiO_3$ (barium titanate) with a dielectric film, a resin, and a plate makes it possible to prevent the deterioration of the ferroelectric material due to humidity with an inexpensive structure.

According to an aspect of an optical modulation device and a method for manufacturing an optical modulation device disclosed in the present application, it is possible to prevent the degradation of an EO polymer in modulation characteristics and optical characteristics at low cost.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulation device comprising:
   a substrate;
   a slot waveguide formed by arranging a pair of electrodes in a groove formed on one side of the substrate and by filling the groove with an electro-optical material;
   a dielectric film that expands in a wider area than an area in which the slot waveguide is formed to cover both a surface of the electro-optic material filled in the slot waveguide and a surface of the substrate;
   an adhesive resin that is applied to the wider area on a surface of the dielectric film; and
   a plate member that is flat and parallel to the substrate, wherein whole surface of the plate member is bonded with the adhesive resin to cover the dielectric film.

2. The optical modulation device according to claim 1, wherein
   the slot waveguide is formed by filling the groove with an electro-optic polymer material.

3. The optical modulation device according to claim 1, wherein
   the dielectric film is formed with an oxide, a nitride, or an oxynitride of aluminum or silicon.

4. The optical modulation device according to claim 1, wherein
   the dielectric film includes
   a first dielectric film that covers both a surface of the electro-optic material and a surface of the substrate, and
   a second dielectric film that covers a resin layer applied to the first dielectric film, and
   the plate member is bonded to the second dielectric film.

5. A method for manufacturing an optical modulation device, the method comprising:
   forming a slot waveguide filled with an electro-optic material in a groove formed on a substrate;
   arranging a dielectric film that expands in a wider area than an area in which the slot waveguide is formed to cover both a surface of the electro-optic material filled in the slot waveguide and a surface of the substrate;
   applying an adhesive resin to the wider area on a surface of the dielectric film; and
   bonding a plate member that is flat to the dielectric film with the adhesive resin such that the plate member is parallel to the substrate and covers the slot waveguide.

6. The optical modulation device according to claim 1, wherein
   the plate member is impermeable to oxygen gas.

7. The optical modulation device according to claim 6, wherein
   the plate member is bonded to the dielectric film with the adhesive resin having a low oxygen transmission rate.

* * * * *